A. DAMBOISE.
BOLT AND NUT LOCK.
APPLICATION FILED FEB. 27, 1914.

1,216,957.

Patented Feb. 20, 1917.

Witnesses

Inventor
A. Damboise.

By
Attorney

UNITED STATES PATENT OFFICE.

ARTHUR DAMBOISE, OF MILLINOCKET, MAINE.

BOLT AND NUT LOCK.

1,216,957. Specification of Letters Patent. Patented Feb. 20, 1917.

Application filed February 27, 1914. Serial No. 821,492.

*To all whom it may concern:*

Be it known that I, ARTHUR DAMBOISE, a subject of the King of Great Britain, residing at Millinocket, in the county of Penobscot and State of Maine, have invented certain new and useful Improvements in Bolt and Nut Locks; and I do hereby declare the following to be a full, clear, and exact description of the invention, such as will enable others skilled in the art to which it appertains to make and use the same.

This invention relates to bolt and nut locks, and one of the principal objects of the invention is to provide a bolt and nut lock which will be secure, which will permit the adjustment of the nut on the bolt and which will lock it in place when adjusted, and which may be readily withdrawn from the bolt by means of a simple tool.

Another object of the invention is to simplify the construction of bolt and nut locks and to provide means whereby the nut may be quickly removed from the bolt whenever desired.

Figure 1:
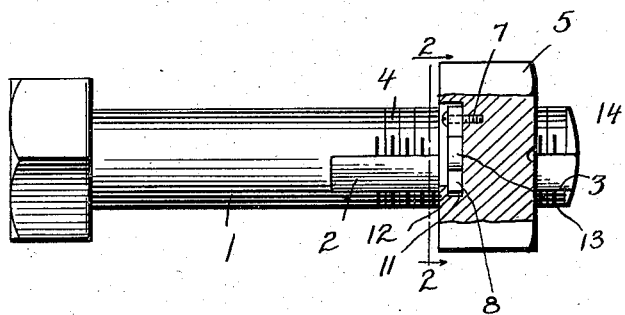

These and other objects may be attained by means of the construction illustrated in the accompanying drawing, in which, Figure 1 is a side elevation of a bolt having a nut thereon, said nut being shown in partial section and constructed in accordance with this invention.

Figure 2:
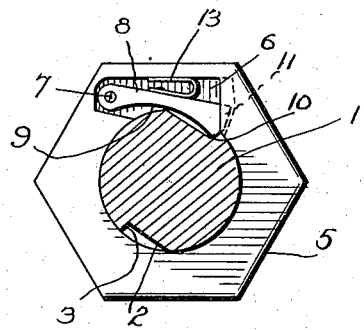

Fig. 2 is a sectional view on the line 2—2 of Fig. 1, looking in the direction indicated by the arrows.

Referring to the drawings, the numeral 1 designates a bolt having oppositely disposed ratchet grooves 2 formed therein, said grooves each having a shoulder 3, and said grooves extending throughout the threaded portion 4 of the bolt.

The nut 5 is provided upon its inner face with a recess 6. Pivoted upon a screw 7 in said recess is a pawl or dog 8, having a curved inner edge 9 terminating in a nose 10 and a projection 11, the latter being inclosed within the recess 6 by the projecting wall 12, which serves to prevent the withdrawal of the pawl. A spring 13, bent in substantially U-shape is secured to the outer edge of the dog 8, said spring bearing against the upper wall of the recess 6 to hold the dog or pawl 8 into engagement with the shoulder 3 of the ratchet groove in the bolt.

From the foregoing it will be obvious that as the nut is turned upon the bolt, the dog or pawl 8 will ride over the grooves and engage the shoulders 3 of said grooves. In order to indicate the position of the pawl in the nut, suitable marks 14 are made upon one of the wrench engaging surfaces adjacent to the pawl recess.

The nut may be turned at any time to hold the parts closer together when they have become loosened in use, and when it is desired to remove the nut entirely from the bolt an instrument may be inserted in the groove 2 to lift the pawl out of engagement with the shoulder 3 when the nut may then be turned off the bolt.

What is claimed is:—

The hereindescribed bolt and nut lock comprising a bolt provided with a groove, a nut provided in its inner face with a recess opening at one side out through the bore of the nut, a shoulder extending into the recess from one of the end walls thereof in spaced relation to the bottom wall thereby forming a pocket, a pawl pivoted at one end in said recess near the other end wall thereof, a nose on the free end of the pawl for engagement with said groove, a projection on the free end of the pawl extending beyond the nose and located in said pocket, one wall of said pocket holding the pawl against said bottom wall and preventing the outward movement thereof, and a spring engaging said pawl.

In testimony whereof I affix my signature in presence of two witnesses.

ARTHUR DAMBOISE.

Witnesses:
C. A. SMART,
LOUIS DUBORZ, Jr.